Oct. 8, 1940.  B. F. HERR ET AL  2,216,838
TEMPERATURE CONTROL SYSTEM
Filed Dec. 30, 1938
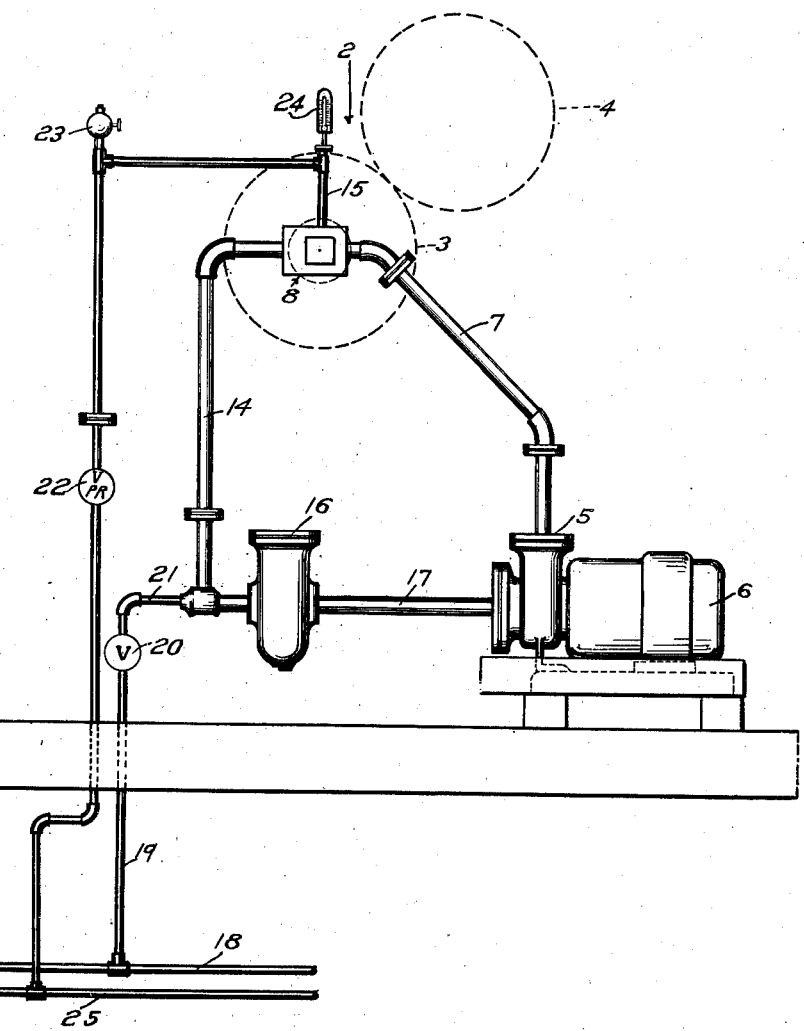
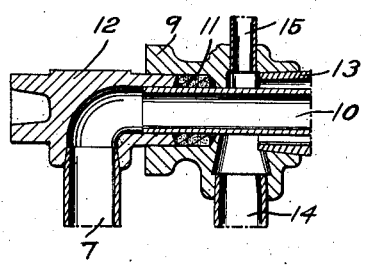

Patented Oct. 8, 1940

2,216,838

UNITED STATES PATENT OFFICE 2,216,838

TEMPERATURE CONTROL SYSTEM

Benjamin F. Herr and Arthur W. Bassett, Lancaster, Pa., assignors to Armstrong Cork Company, Lancaster, Pa., a corporation of Pennsylvania Application December 30, 1938, Serial No. 248,453

7 Claims. (Cl. 62—2)

This invention relates to an apparatus or system for maintaining a substantially constant temperature at the surface of a body, the surface temperature of which must be minutely controlled.

The invention finds particular usefulness in linoleum manufacture where it is desirable to maintain a constant temperature at the surface of the calender rolls and particularly the face roll of the sheeting calender employed in the manufacture of marbleized type striated linoleum. In the manufacture of this product, where deviation of the temperature from a predetermined maximum limit has deleterious effects upon the character of the graining and where precise control within extremely narrow limits is beneficial to the production of a satisfactory product having a uniform graining from edge to edge throughout the extent of its length, accurate temperature control is obviously essential. Additionally, in the manufacture of such product, it is desirable to insure that the graining characteristics of all material manufactured be substantially the same as the material made on previous runs of the same pattern, to guarantee perfect matching of the product when subsequently installed.

The common practice in marbleized linoleum manufacture has been to circulate a relatively small volume of brine at a relatively low temperature through the calender rolls in order to effectuate the proper heat transfer and thus maintain a desired temperature at the working surface of the rolls. This has not been satisfactorily accomplished by the apparatus heretofore available. The most common difficulty has been to maintain a substantially uniform temperature across the face of the roll from edge to edge of the working surface, it being generally found that the portion of the face of the roll adjacent the zone of introduction of the brine will be materially colder than the zones adjacent the exhaust end of the roll, the temperature gradient progressively increasing from the injector end to the exhaust end of the roll surface, in a direction parallel to the axis of the roll.

In the manufacture of marbleized linoleum, the composition in small lumps or masses of base and variegating color is first calendered to produce a variegated sheet having veining running generally parallel to the length of the sheet as it is formed. Since the major constituents of linoleum are oxidized oils and fillers and the oil is of a thermoplastic character, heat above a limited temperature will change the entire character of the veining. The veining depends to a large extent upon the plasticity or extrudability of the mix and these characteristics are changed by heat—the binder being thermoplastic. As the heat increases above the desired maximum, the veining becomes longer and more drawn out due to greater extrusion and there is a general blurring or interspersion of the variegating color or colors into the base color, resulting in a clouded effect upon subsequent operations on the sheet. The sheet prepared as above described is cut transversely into strips of a length substantially equivalent to the width of the sheeting calender and these strips are fed thereto in a direction at right angles to their length or to the direction of the veining and cross rolling is effected to produce what is known to the art as "cross grained marble" effect.

If the veined sheet be clouded rather than having the variegating colors clearly demarked in the base color, the marble graining will not be clearly defined or truly representative of the graining characteristics to be reproduced.

In the cross rolling operation, temperature control is likewise of paramount importance for upon it depends the character of the graining of the final product, assuming that the veined sheet originally produced is of the desired character. The usual face roll temperatures are in the range between 25° F. and 45° F. depending upon the particular mix being operated upon and other variable conditions. If the temperature of the surface of the face roll varies widely from edge to edge, the character of the graining will likewise vary from edge to edge of the sheet along its length, the graining formed where the roll is warmest being excessively extruded and having a generally "directional," clouded and undesired aspect, whereas the graining formed where the roll is at about the desired temperature will have the requisite characteristics of short, fine but clearly defined cross graining, characteristic of natural marble.

The deficiencies of the prior apparatus are common and well known. For example, in the manufacture of some types of linoleum graining, it is desirable to maintain a face roll temperature of about 40° F. and with the prior apparatus it was not uncommon to have a 20° F. temperature differential from end to end of the roll so that the roll temperature in the injector zone would be 40° F. whereas the roll temperature at the exhaust zone would be 60° F.

According to our invention, we provide a system whereby heat transfer fluid, such as brine, is circulated in a relatively large volume to the surface to be controlled and is recirculated therefrom in a closed circuit, means being provided for introducing into said closed system fresh heat transfer fluid, such as brine from a refrigerating system, in a quantity sufficient to compensate for the temperature change in the heat transfer fluid in the closed circuit to thereby maintain a substantially uniform temperature in the heat transfer fluid fed to the surface to be controlled and means are also provided for automatically discharging from the system spent heat transfer fluid in an amount sufficient to compensate for the fresh heat transfer fluid introduced into the system to thereby maintain a substantially constant pressure therewithin. By this system it is possible to accurately maintain the surface temperature of the roll from end to end within minute limits. In actual practice, we have found it possible to maintain the surface temperature of an eight-ton calender roll to within 1° F. from end to end of the roll so that where a 40° F. surface temperature is desirable, we may maintain the injector end at 39½° F. and the exhaust end at 40½° F. with the intermediate working zone being maintained at substantially 40° F.

This system is extremely economical to operate since it requires a minimum of fresh heat transfer fluid, the desired effect being attained by recirculation, within the closed system at a relatively high flow rate, of heat transfer fluid maintained at a temperature closely approaching the desired roll temperature.

In order that a complete understanding of our invention will be facilitated, we describe the same in conjunction with the attached drawing in which:

Figure 1 is a schematic lay-out showing the system of our invention applied to a linoleum calender; and Figure 2 is a detailed view of the roll injector arrangement and the exhaust and recirculation tubes.

As a typifying example, our system will be described in connection with a linoleum calender, the surface of the face roll at least of which is assumed to require a maintained temperature below normal room temperature, say 40° F.

Referring to Figure 1, there is shown in dotted lines a calender generally indicated by the numeral 2 and including a face roll 3 and a back roll 4. The surface of the roll 3 is adapted to form the face surface of the linoleum sheet, the roll 4 forming the rear surface of the calendered sheet. As in all calender operations where there is material reduction in thickness of the product from the body fed to the calender to the product emanating therefrom, there is considerable frictional heat developed during the calendering operation and the material may be relatively warm when it is fed to the calender. There is, therefore, an immense heat transfer from the linoleum to the roll and this must be properly controlled to obtain the desired graining effect.

Our fluid heat transfer system, which in the typical embodiment chosen for illustration is designed for operation with brine, comprises a fluid pump, including a centrifugal pumping unit 5 driven by a motor 6. Heat transfer fluid is forced through a pipe line 7 to the injector mechanism of the calender roll 3, which mechanism is generally indicated by the numeral 8 and is effective for directing the heat transfer fluid into the body of the roll. This injector-exhaust mechanism per se forms no part of the present invention, but will be generally described in order that the operation of the system of our invention will be clearly understood. The mechanism is generally shown in Figure 2 and comprises a main casting 9 which is fixed and receives an injector tube 10 of suitable length for directing the heat transfer fluid within the roll body. The injector tube 10 is adapted to rotate with the roll 3, and the joint between the injector tube 10 and the casting 9 is sealed by packing 11 held in compression by a packing gland 12. The roll 3 may be provided with suitable openings parallel to its axis and spaced closely adjacent the peripheral or working surface to direct the cooling fluid as closely adjacent that surface as possible. Preferably, the roll is formed as disclosed in the copending application of Arlington C. Perry and Benjamin F. Herr, Serial No. 203,952, filed April 23, 1938, since by the use of such roll the utmost advantages of the present invention are attained. The present invention is useable, however, with rolls of the type now commonly employed and other similar rolls. The heat transfer fluid after circulation through the roll and absorption of heat from the linoleum is conveyed through a pipe 13 which is of greater diameter than the tube 10 and encircles the same, the heat transfer fluid being discharged into a recirculation line 14 forming part of the closed circulatory system as more fully hereinafter described. At the top of the casting 9 there is provided an exhaust tube 15 for discharge of spent heat transfer fluid. This, likewise, will be more completely hereinafter described in purpose and function.

The recirculation line 14 is connected to a strainer 16 through which the recirculated heat transfer fluid passes prior to its movement to the intake end of the pump 5 through pipe line 17. It will be observed, therefore, that the closed system includes a pump 5 for forcing heat transfer fluid under pressure through pipe line 7 to the surface of the roll 3 to be controlled and that the heat transfer fluid after passage through the roll is conveyed by the recirculation line 14 to a strainer 16 and thence by a pipe line 17 to the pump 5 to complete the closed system.

One of the problems encountered in maintaining proper temperatures in calendering rolls has been the elimination of loose scale or other foreign particles from the system. These foreign objects have often become lodged in the roll openings, thus causing improper circulation of the heat transfer fluid, resulting in areas of the roll being materially warmer than other portions, and the warm areas causing recurring defects in the graining characteristics. The strainer 16 eliminates this problem entirely since all foreign objects are removed prior to recirculation of the heat transfer fluid to the pump, and the fluid is thus continuously filtered.

To compensate for the temperature rise in the heat transfer fluid in the closed system due to heat transfer from the linoleum during the calendering operation, we provide means for introducing into the closed system a relatively small volume of fresh or unspent heat transfer fluid. In the illustrated embodiment, a heat transfer fluid supply line 18 is connected to a source of refrigerated brine, and this is fed by pipe line 19 through a control valve 20 to an injector 21 functioning to inject such fresh heat transfer fluid directly into the closed circuit at a point in advance of the strainer 16 so that such fresh heat transfer fluid is first filtered and mixed with the recirculated heat transfer fluid prior to being pumped to the roll 3.

The valve 20 is hand operated but may be thermostatically controlled if the particular conditions encountered in use warrant it. For ordinary purposes on linoleum calenders, a hand controlled valve has been found satisfactory. In order to inject such heat transfer fluid into the closed system, it is essential, of course, to have the pressure in the supply line 18 higher than the pressure in the closed system at the injector 21. We have found that a working pressure of 15 pounds in the closed system and a pressure of 40 pounds in the supply line will operate with good results.

To compensate for such heat transfer fluid fed to the system and to exhaust therefrom spent heat transfer fluid and avoid the building up of undue pressure in the system, insuring the maintenance of a substantially uniform volume of heat transfer fluid therein, we provide a pressure relief valve 22 in the return line 15 previously mentioned. This valve 22 is adjusted to open upon the attainment of a predetermined pressure in the closed system. In the illustrated embodiment a pressure of 15 pounds is desired in the system and, accordingly, the pressure relief valve 22 will be set to release at that pressure. If fresh heat transfer fluid is continuously fed to the system through the valve 20, then the pressure relief valve 22 will normally be open in an amount sufficient to permit the exhausting of a comparable quantity of spent heat transfer fluid, thus maintaining a uniform pressure within the closed system. The exhaust line 15 preferably rises to a point at least as high as the level of the circulation tubes in the calender 3 so as to insure that all tubes will be completely filled with heat transfer fluid at all times. In order to expel any air which may collect in the system, the pipe line 15 is provided with a petcock 23 at its highest point which is opened to vent the system.

In order that the calender operator may observe the temperature of the heat transfer fluid as it is exhausted, a thermometer or other temperature indicator 24 is provided in the exhaust line 15.

The mode of operation of our system may be briefly described as follows: Employing a typical set of conditions, commonly encountered in linoleum manufacture; it will be assumed that the surface of the calender roll 3 is to be maintained at a temperature of 40° F. In order to effect this, the temperature of the brine as it leaves the pump 5 should be about 9° F. and it should be circulated at the rate of about 150 gallons per minute. When the brine leaves the calender roll through the exhaust tube 14 it will have attained a temperature of about 12° F. In order to compensate for the rise in temperature of 3° F. from the 9° F. temperature at the point of injection of the fluid to the roll, to the 12° F. temperature at the point of exhaust from the roll, it will be necessary to inject into the closed system at the rate of about 15 to 20 gallons per minute fresh brine from the supply line 18 which fluid has a temperature of about −20° F. When operating under 15 pounds pressure in the closed system, the pressure relief valve 22 will be set to open at that pressure and 15 to 20 gallons of spent heat transfer fluid will be discharged through the pipe line 15 to its return line 25. By such operation the temperature of the fluid fed to the roll may be maintained substantially constant and only 15 to 20 gallons of brine will be used to effect the proper heat dissipation. If any observable difference exists in the system as registered by the indicator 24, the setting of the valve 20 may be altered and the pressure relief valve 22 will maintain a constant pressure within the system.

If it be desired to thermostatically control the temperature of the heat transfer fluid, a thermostat may be placed in the return line 15 for example, in place of the thermometer 24, and may be electrically connected with an electrical control valve replacing the hand operated valve 20, the arrangement being such that when the temperature in the return line 14 exceeds a predetermined degree the electric valve will be opened and heat transfer fluid will be injected into the system to maintain the desired temperature. Such control has not been found necessary with linoleum calendering. It has been observed that by maintaining a temperature differential of about 28° F. between the desired face roll surface temperature and the temperature of the exhaust heat transfer fluid the desired temperature conditions will exist. For example, when it is desired to maintain a temperature of 40° F. at the surface of the face roll 3 a reading of 12° F. on the thermometer 24 will indicate that a temperature of 40° F. exists at the surface. Our system is, therefore, simple to operate and, since only a relatively small volume of fresh heat transfer fluid is introduced to the system, operating economies are effected. Our system operates on the principle of recirculating heat transfer fluid at a temperature closely approaching the desired surface temperature at a relatively high rate of flow and adding to such fluid in circulation a relatively small increment of fresh heat transfer fluid to maintain a uniform temperature in the mixture fed to the surface to be controlled.

While we have described and illustrated certain preferred embodiments of our invention, it will be understood that the invention may be otherwise embodied and practiced within the scope of the following claims.

We claim:

1. In a system for the control of temperature at the working surface of a body, a source of pressure supply of unspent heat transfer fluid, a substantially closed system for the circulation of heat transfer fluid under pressure, including a fluid pump, means for conveying heat transfer fluid from said pump to the surface to be controlled, and means for recirculating said fluid from said surface back to said pump, a pressure relief valve for maintaining the pressure of said fluid in said circulating system substantially constant, and means for introducing unspent heat transfer fluid from said source of pressure supply into said circulating system.

2. In a system for the control of temperature at the working surface of a body, a source of supply of unspent heat transfer fluid, a substantially closed system for the circulation of heat transfer fluid under pressure, including a fluid pump, means for conveying heat transfer fluid from said pump to the surface to be controlled, and means for recirculating said fluid from said surface back to said pump, means for continuously filtering said heat transfer fluid in said system, a pressure relief valve for maintaining the pressure in said system substantially constant, means for continuously introducing unspent heat transfer fluid from said source of supply into said circulating system, and means for discharging spent heat transfer fluid from said circulating system through said pressure relief valve.

3. In a system for the control of temperature at the working surface of a rotating body, a source of pressure supply of unspent heat transfer fluid, a substantially closed system for continuously circulating heat transfer fluid under pressure, including a fluid pump, means for conveying heat transfer fluid from said pump to the surface to be controlled, and means for recirculating said fluid from said surface back to said pump, means for continuously filtering said heat transfer fluid in said system, means for the discharge of heat transfer fluid from said recirculating system, said last named means including a fluid conveying member disposed at an elevation at least as high as the level of heat transfer fluid to be maintained in said rotating body, a pressure relief valve in said means for the discharge of heat transfer fluid for maintaining a constant pressure within the system less than the pressure of said source of pressure supply of unspent heat transfer fluid, means for introducing unspent heat transfer fluid from said source of pressure supply into said circulating system, and means for controlling the flow of said unspent heat transfer fluid into said system.

4. In a system for the control of temperature at the working surface of a body, a source of pressure supply of unspent refrigerated heat absorbing fluid, a substantially closed system for the circulation of refrigerated heat absorbing fluid under pressure, including a fluid pump, means for conveying said refrigerated heat absorbing fluid from said pump to the surface to be controlled, means for recirculating said refrigerated heat absorbing fluid from said surface back to said pump, an adjustable pressure relief valve for maintaining a substantially constant pressure of refrigerated heat absorbing fluid in said circulating system, and means for introducing said unspent refrigerated heat absorbing fluid from said source of pressure supply into said circulating system.

5. In a system for the control of temperature at the working surface of a rotating body, a source of supply of unspent heat transfer fluid, a substantially closed system for continuously circulating heat transfer fluid under pressure, including a fluid pump, means for conveying heat transfer fluid from the pump to the surface to be controlled, and means for recirculating said fluid from said surface back to said pump, a discharge line disposed above the level of heat transfer fluid to be maintained in said rotating body for the discharge of spent heat transfer fluid from said system, means in said discharge line for the removal of entrapped gases from said system, a pressure relief valve for regulating the discharge of heat transfer fluid from said system to maintain a substantially constant pressure therewithin, and means for introducing unspent heat transfer fluid from said source of supply into said circulating system.

6. In a method of maintaining a substantially uniform temperature at the working surface of a calender roll, the steps consisting in continuously circulating refrigerated brine under pressure to said calender roll and recirculating such brine therefrom in a substantially closed circuit and under predetermined pressure, continuously injecting into said circuit unspent refrigerated brine at a temperature substantially lower than the temperature of the brine in circulation, mixing the unspent brine with the brine in circulation and filtering the resultant mixture prior to presenting the same to the calender roll, and discharging spent brine from said circuit upon the attainment of a predetermined pressure therein.

7. In a method of maintaining a substantially uniform temperature at the working surface of a calender roll, the steps consisting in continuously circulating refrigerant under pressure to said calender roll and recirculating such refrigerant therefrom in a substantially closed circuit under predetermined pressure, at a temperature closely approaching the desired temperature at the working surface of the calender roll, and at a relatively high rate of flow, injecting into said circuit a relatively small increment of unspent refrigerant at a temperature substantially lower than the temperature of the refrigerant in circulation, mixing the unspent refrigerant with the refrigerant in circulation, and discharging spent refrigerant from said circuit on the attainment of a predetermined pressure therein.

BENJAMIN F. HERR.
ARTHUR W. BASSETT.